United States Patent [19]

Sakata et al.

[11] Patent Number: 5,339,460
[45] Date of Patent: Aug. 16, 1994

[54] AMPLIFIER PROVIDED AT OUTPUT STAGE OF INTERMEDIATE FREQUENCY AMPLIFYING CIRCUIT OF MOBILE COMMUNICATION SYSTEM

[75] Inventors: Minoru Sakata; Noriyoshi Komatsu, both of Sendai, Japan

[73] Assignee: Fujitsu Limited, Japan

[21] Appl. No.: 959,779

[22] Filed: Oct. 13, 1992

[51] Int. Cl.[5] .............................................. H04B 1/18
[52] U.S. Cl. ..................... 455/343; 455/38.3; 455/127
[58] Field of Search ..................... 455/343, 38.3, 127

[56] References Cited

U.S. PATENT DOCUMENTS 3,611,156  8/1971  Ward ................................. 455/343
3,896,383  7/1975  Bilotti ............................... 455/343

Primary Examiner—Reinhard J. Eisenzopf
Assistant Examiner—Mark D. Wisler
Attorney, Agent, or Firm—Greer, Burns & Crain Ltd.

[57] ABSTRACT

In a mobile communication system wherein only the circuits necessary for detecting a call send or a call receive operation are activated intermittently to reduce power consumption from a battery during a stand-by period, and all of the circuits are continuously activated by being supplied with power during a call operation, an amplifier is provided at an output stage of an intermediate frequency amplifying circuit in the system. The amplifier has an output transistor whose output terminal is connected to a load circuit via a capacitor, a circuit for supplying an operating direct current to the output transistor and a semiconductor switch provided in the current supply circuit. When the semiconductor switch is cut off, a leakage current flows through the output transistor, so that an average direct current voltage level is generated at the output terminal of the transistor. Accordingly, when the semiconductor switch is turned ON, the average direct current voltage level at the load circuit is obtained at high speed, and the rise time characteristics of the load circuit are improved.

5 Claims, 8 Drawing Sheets

Fig. 5A  SWITCH 31 ON/OFF
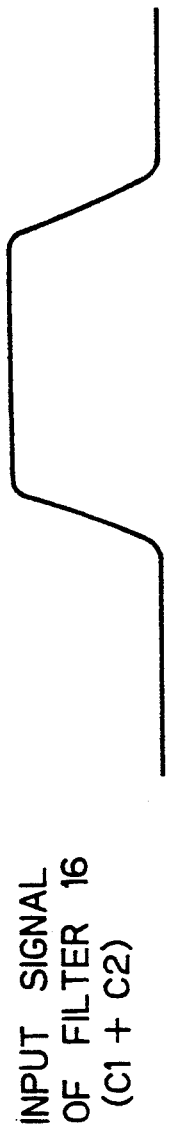
Fig. 5B  INPUT SIGNAL OF FILTER 16 (C1 + C2)
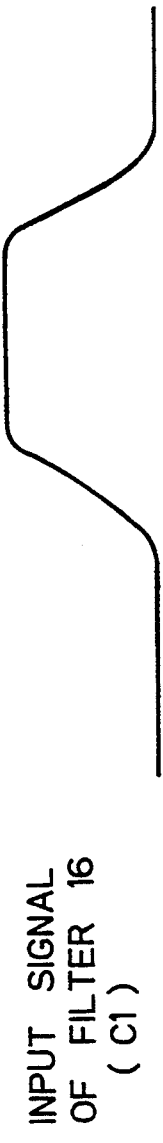
Fig. 5C  INPUT SIGNAL OF FILTER 16 (C1)

AMPLIFIER PROVIDED AT OUTPUT STAGE OF INTERMEDIATE FREQUENCY AMPLIFYING CIRCUIT OF MOBILE COMMUNICATION SYSTEM

BACKGROUND OF THE INVENTION

1) Field of the Invention

The present invention relates to an amplifier provided at an output stage of an intermediate frequency amplifying circuit of a mobile communication system. More specifically, the present invention relates to an amplifier provided at an output stage of an intermediate frequency amplifying circuit of a mobile communication system that is activated intermittently for reducing power drain on the battery.

2) Description of the Related Art

The automobile has become indispensable in contemporary life, and comfort and convenience when driving has become increasingly important. To this end, vehicles can be provided with a mobile communication system which can be used as a telephone system.

An automobile equipped with a mobile communication system, e.g., a mobile telephone system, is called a mobile station, and this mobile station can communicate not only with a fixed telephone such as a telephone in an office or at home but also with another mobile station. This communication is established by radio waves between the mobile station and a land station, and is transferred to a conventional telephone system at the land station.

In a typical analog mobile communication system, a user of the system occupies one frequency for transmission and another frequency for receiving to communicate. This system is called a frequency-division multiple access (FDMA) in a mobile communication system.

Incidentally, in the mobile communication system, a service area of one land station that is called a zone is limited, and according to the movement of the mobile station from a certain zone to another zone, the mobile station has to change communication channels by changing the communication frequency. Accordingly, in the mobile communication system, when the mobile station is communicating by using one channel at a certain zone, the mobile station intermittently detects the RSSI (received signal strength indicator) levels of the other channels in neighboring zones one by one. Note that, the useable channels in the neighboring zones are previously determined by the system. The detected RSSI levels of the other channels in the neighboring zones are reported to the land station to which the mobile station is presently communicating, and the reported RSSI levels are monitored by the land station. As a result, when the mobile station moves to another zone, a suitable channel having the highest RSSI level at the other zone is selected by the land station, and the switching of the communication channel is executed.

In the mobile communication system, a stand-by period of the mobile station is generally far longer than a communicating period thereof. The stand-by period means the time period that the mobile station is waiting for a call send or a call receive operation. Accordingly, in the mobile communication system, only the circuits necessary for receiving data and detecting a call send or a call receive operation from the received data are activated intermittently to reduce power consumption from the battery during the stand-by period. And, when the call send or the call receive operation is detected from the received data, the other circuits necessary for communicating are activated.

An intermediate frequency amplifying circuit and an active filter connected to the intermediate frequency amplifying circuit via a capacitor are the part of the circuits necessary during stand-by. And due to the existence of the capacitor between the intermediate frequency amplifying circuit and the active filter, the rise time characteristics of the input signal to the active filter become worse, so that the output signal from the active filter is delayed and the detection of a call send or a call receive operation is also delayed.

As a countermeasure to this delay, a rise time speed-up circuit is provided in series with the capacitor. However, providing the speed-up circuit causes an increase in the number of circuit elements and an increase in cost.

SUMMARY OF THE INVENTION

An object of the present invention is to provide an amplifier at an output stage of an intermediate frequency amplifying circuit of a mobile communication system by which the rise time characteristics of the input signal to the active filter are improved along with simplification of the circuit and at a low cost.

According to an aspect of the present invention, there is provided an output stage of an intermediate frequency amplifying circuit of a mobile communication system wherein only the circuits necessary for detecting a call send or a call receive operation are activated intermittently to reduce power consumption from the battery during a stand-by period, and all of the circuits are continuously activated by being supplied with power during a call operation, an amplifier provided at an output stage of an intermediate frequency amplifying circuit of said mobile communication system comprising: an output transistor an output terminal thereof being connected to a load circuit via a capacitive connecting circuit; a circuit for supplying an operating direct current to the output transistor; a semiconductor switch provided in the current supply circuit; and a control signal generating means for applying an ON signal to an input terminal for switching control of the semiconductor switch periodically in a predetermined time when the system is in a stand-by period but continuously when the system is in a calling period.

According to the present invention, even when the semiconductor switch is in a cut-off state, a leakage current is flowing through the output transistor, so that an average direct current voltage level that is required in the load circuit at the output terminal of the transistor is generated. Accordingly, when the semiconductor switch is turned ON, the average direct current voltage level at the load circuit is obtained at high speed. Namely, the rise time characteristics of the load circuit are improved.

BRIEF EXPLANATION OF THE DRAWINGS

The present invention will be more clearly understood from the description as set forth below with reference to the accompanying drawings, wherein:

FIG. 5A shows an ON/OFF pulse of the switch 31 in FIG. 3;

FIG. 5B shows an input signal of the filter 32 in FIG. 3 when capacitors C1 and C2 are activated;

FIG. 5C shows an input signal of the filter 32 in FIG. 3 when only a capacitor C1 is activated;

DESCRIPTION OF THE PREFERRED EMBODIMENTS

Before describing the preferred embodiments, an explanation will be given of the conventional construction of the coupling part of an intermediate frequency amplifying circuit and an active filter of the mobile communication system, with reference to FIGS. 1 to 6.

Figure 1:
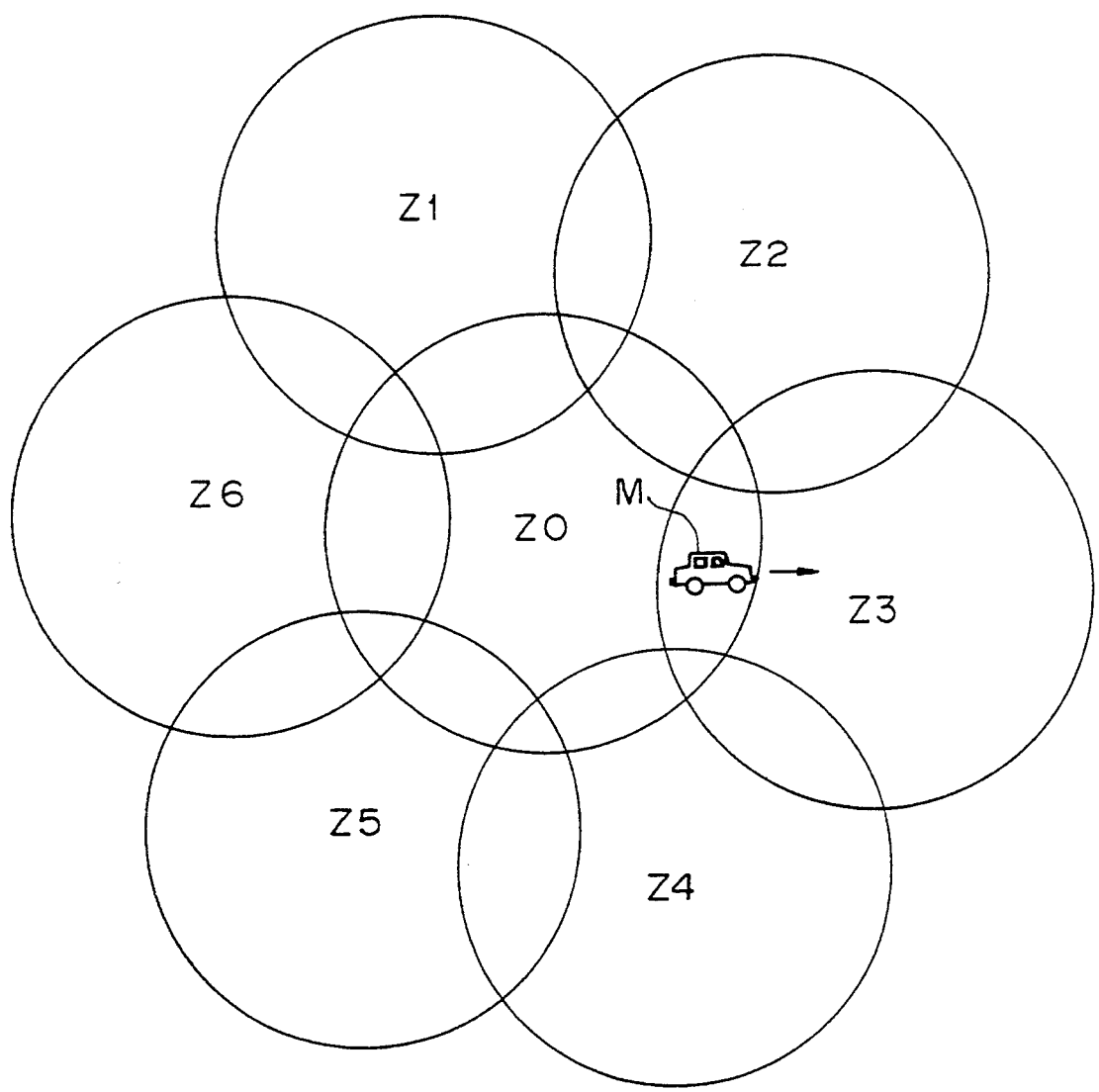
FIG. 1 is a plane view of the service areas of the mobile communication system.

Usually, in a mobile communication system, a service area of one land station, called a zone, is limited. FIG. 1 is a plane view for explaining the service areas (hereinafter called zones) of the conventional mobile communication system. When an automobile M is in zone Z0, a user of the mobile communication system in the automobile M (a mobile station) communicates to a person via a land station (not shown) of the zone Z0 by using a certain channel in the zone Z0. However, if the automobile M moves into a zone Z3, and if the communication by the user in the automobile M is continued, the communication channel changes to a previously determined other related channel in the zone Z3. Namely, in the mobile communication system, the mobile station has to change communication channels according to the movement of the mobile station from a certain zone to another zone.

Figure 2:
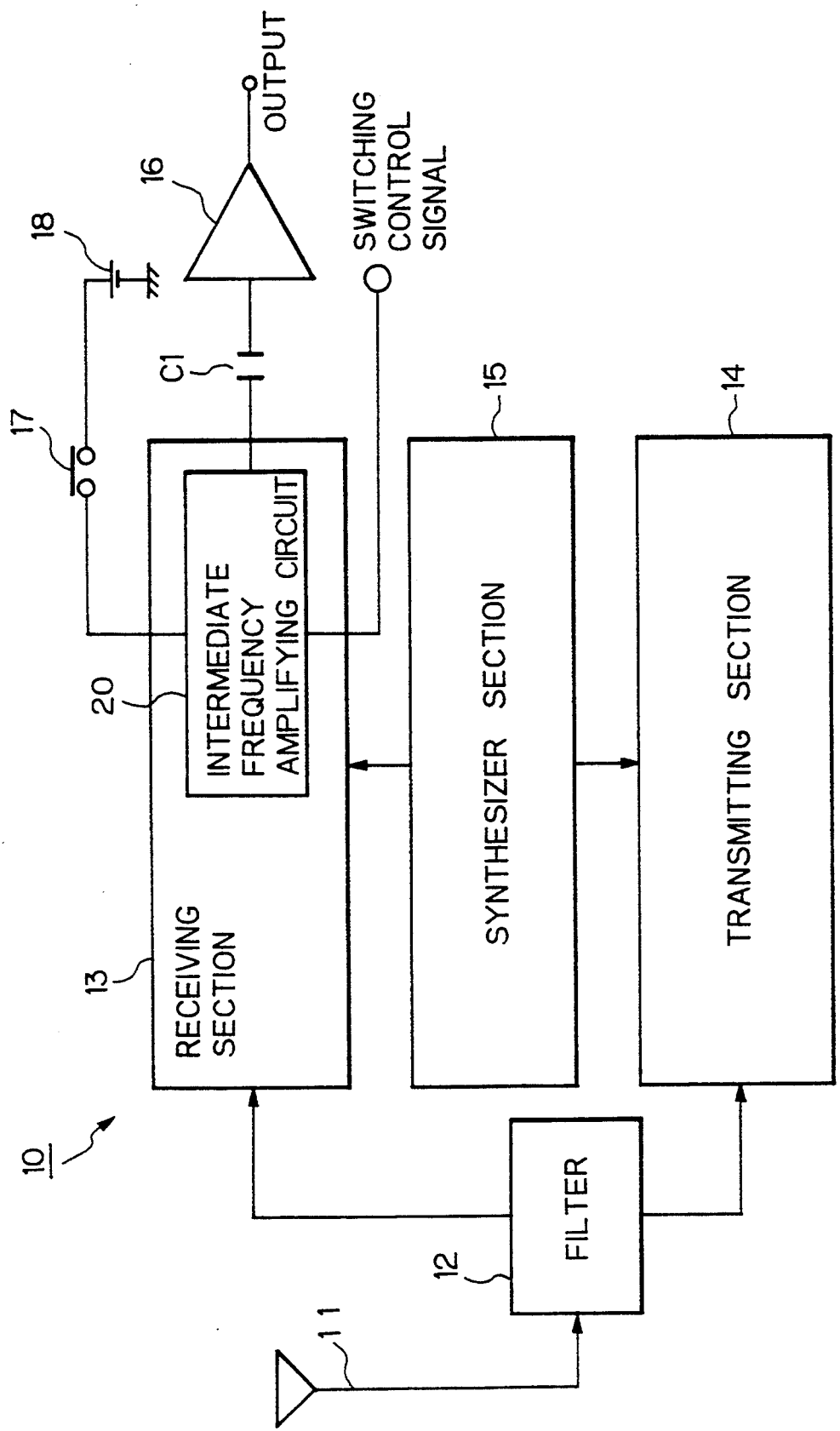
FIG. 2 is a block diagram showing the construction of a conventional mobile communication system.

FIG. 2 is a block diagram showing the construction of the conventional mobile communication system 10. In FIG. 2, reference numeral 11 denotes an antenna, 12 denotes a filter, 13 denotes a receiving section including an intermediate frequency amplifying circuit 20, 14 denotes a transmitting section, 15 denotes a synthesizer section, 16 denotes an active amplifier, 17 denotes a semiconductor switch provided between the intermediate frequency amplifying circuit 20 and a power source 18, and C1 denotes a coupling capacitor provided between the intermediate frequency amplifying circuit 20 and the active filter 16.

In the mobile station 10, a stand-by period is far longer than a communicating period and the receiving section 13 is activated by turning ON the switch 17 at the end of the stand-by period. When the semiconductor switch 17 is ON, radio waves are captured by the antenna 11 and the captured radio frequency is applied to the receiving section through the filter 12. In the receiving section, the radio frequency is converted to an intermediate frequency by being mixed with the local oscillating frequency from the synthesizer section 15. The intermediate frequency is amplified in the intermediate frequency amplifying circuit 20 and the amplified intermediate frequency is applied to the active filter 16 via the capacitor C1. The output of the active filter 16 is transmitted to the controller of the system (not shown) and it is detected whether or not the data indicating the call receive operation is included in the output. Note, the controller detects the call send operation from the transmission data, however this operation is not related to the present invention, so that the explanation thereof is omitted.

In this way, the switch 17 is turned ON intermittently and the received data is transmitted to the active filter 16 through the capacitor C1. And the existence of the capacitor C1 between the intermediate frequency amplifying circuit 20 and the active filter 16, the rise time characteristics of the input signal to the active filter 16 become worse, so that the output signal from the active filter 16 is delayed and the detection of the a call send or a call receive operation is also delayed.

Figure 6:
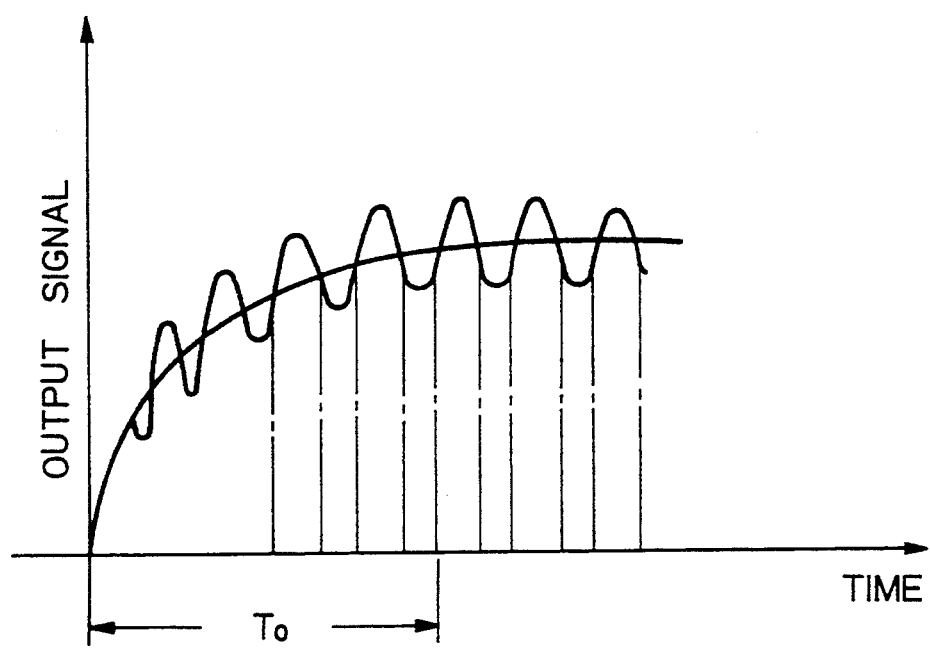
FIG. 6 shows rise time characteristics of the output signal of the active filter 32 in FIG. 3.

FIG. 6 shows the output signal characteristics of the active filter 16 and the sampling timing of the signal. If the sampled level of the output signal of the active filter 16 is low, received data cannot be detected. Accordingly, the received data cannot be detected in the time period T in FIG. 6.

Figure 3:
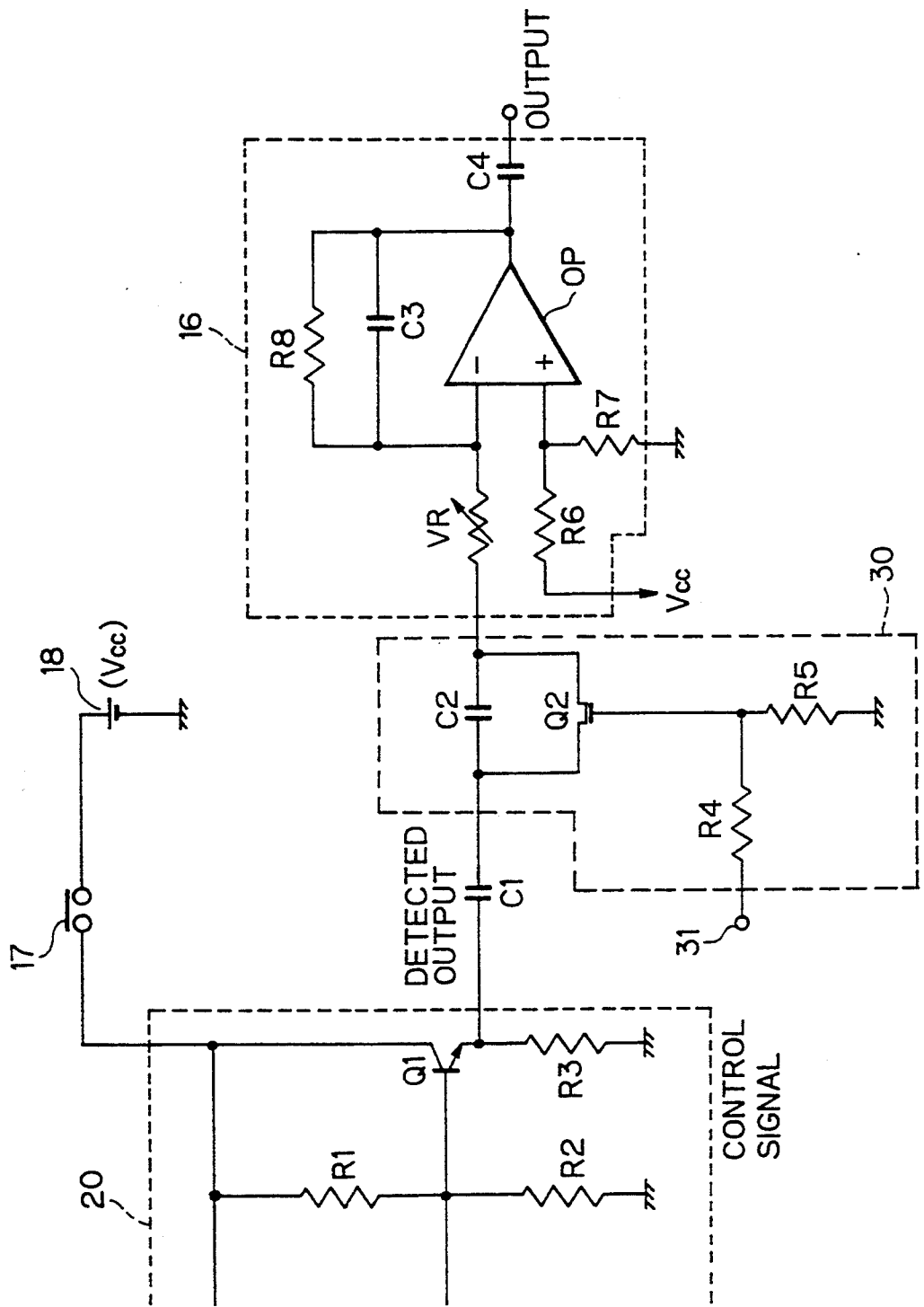
FIG. 3 is a circuit diagram showing a construction of the coupling part of an intermediate frequency amplifying circuit and an active filter according to the conventional mobile communication system shown in FIG. 2.

To cope with this delay, a rise time speed-up circuit 30 (dashed line) is provided in series with the capacitor C1 as shown in FIG. 3. FIG. 3 is a detailed circuit diagram showing a construction of the coupling part of an intermediate frequency amplifying circuit 20 and the active filter 16, and the same parts as used in FIG. 2 are assigned the same reference numerals. In FIG. 3, reference numeral 17 denotes the semiconductor switch, 18 denotes a power source (Vcc), 30 denotes a speed-up circuit, 31 denotes an input terminal, C1 to C4 denote capacitors, OP denotes an operational amplifier, Q1 denotes an NPN type transistor, Q2 denotes a field effect type transistor (FET), R1 to R8 denote resistors, and VR denotes a variable resistor.

The last stage of the intermediate amplifying circuit 20 is composed of three resistors R1–R3 and the transistor Q1. The transistor Q1 is ON when the switch 17 is ON. The speed-up circuit 30 is composed of the capacitor C2, the FET Q2, and two resistors R4 and R5. The capacitance of the capacitor C2 is smaller than that of the capacitor C1, and is connected in series with the capacitor C1. The source and drain of the FET Q2 are connected to the opposite terminals of the capacitor C2, and the base of the FET Q2 is connected to the connecting point of the resistors R4 and R5. The free end of the resistor R5 is grounded and the free end of the resistor R4 is connected to an input terminal 31 to which a control signal is applied. In this embodiment, when the control signal is applied to the input terminal 31, the FET Q2 is turned OFF and the capacitor C2 is connected to the capacitor C1, and when the control signal is not applied to the input terminal 31, the FET Q2 is turned ON and the capacitor C2 is shunted by the FET Q2.

Figure 4:
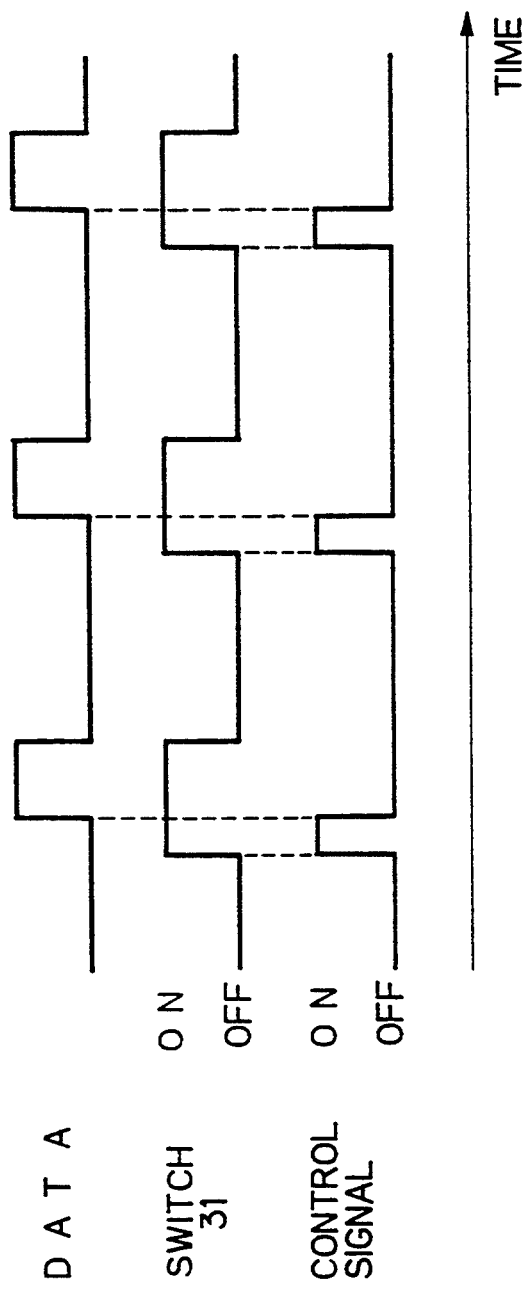
FIG. 4 shows waveforms indicating a timing relation between data, the ON/OFF pulse of the switch 31, and the control signal.

FIG. 4 shows waveforms indicating a timing relation between data D in the received intermediate frequency, the ON/OFF pulse of the switch 31, and the control signal to the speed-up circuit 30. As shown in FIG. 4, when the switch 31 is turned ON, the FET Q2 is simultaneously turned OFF and the capacitor C2 having a small capacitance is connected in series with the capacitor C1. As a result, the time constant of the rise time characteristics of the input signal of the active filter 16 becomes small, so that the rise time characteristics of the input signal of the active filter 16 are improved. After the improvement of the rise time characteristics of the input signal of the active filter 16, the control signal to the speed-up circuit 30 is turned OFF.

FIGS. 5A to 5C show an ON/OFF timing of the switch 31 and the rising and falling characteristics of the input signal of the active filter 16 in a case when capacitors C1 and C2 are activated, and a case when only a capacitor C1 is activated. As shown in FIGS. 5B and 5C, the rise time characteristics of the input signal to the active filter 16 are improved when capacitors C1 and C2 are activated.

However, providing the speed-up circuit 30 causes an increase in the number of circuit elements and a higher cost.

Figure 7:
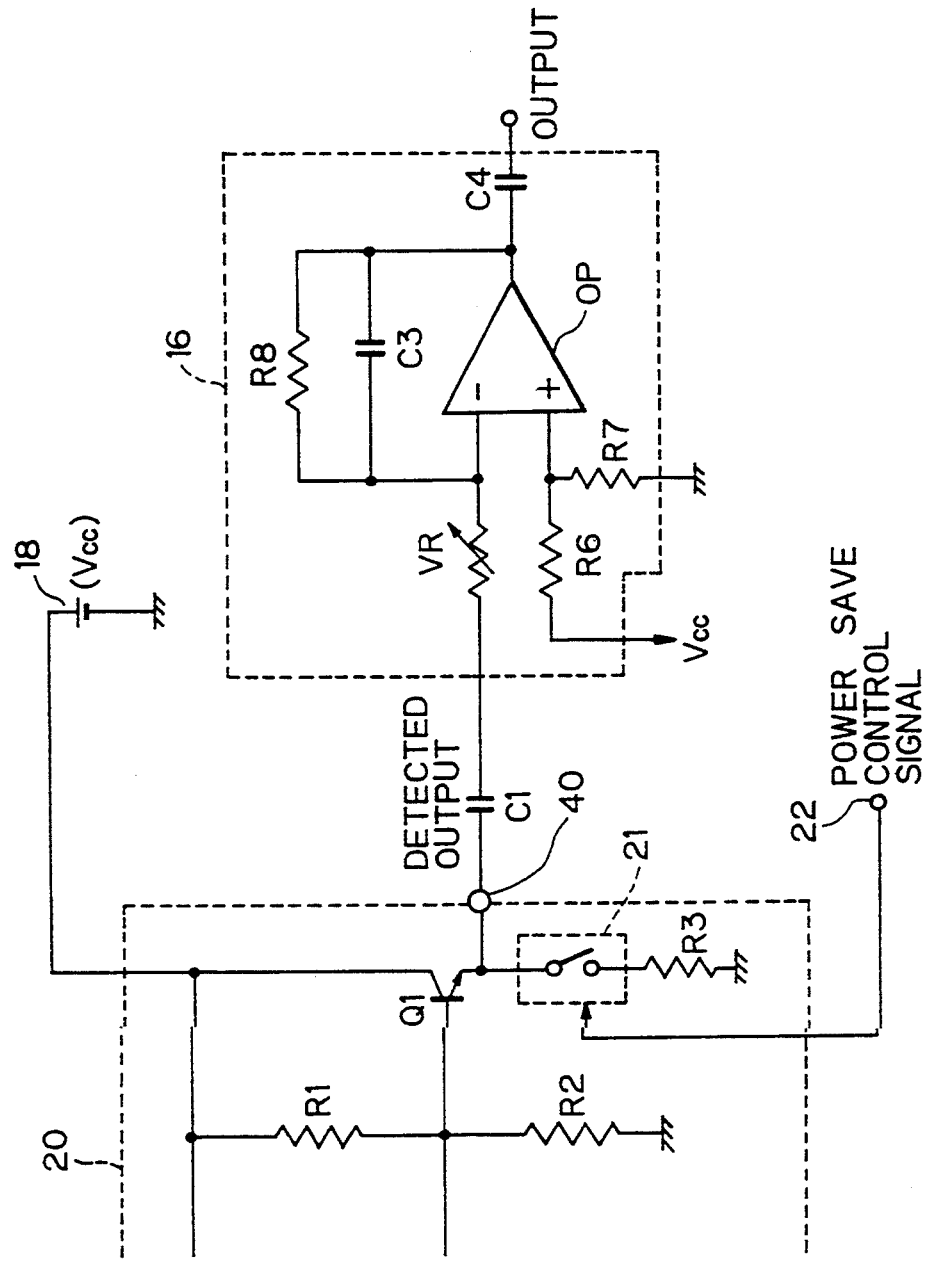
FIG. 7 is a circuit diagram showing the construction of an amplifier provided at an output stage of an intermediate frequency amplifying circuit of a mobile communication system according to the general embodiment of the present invention.

FIG. 7 is a circuit diagram showing the construction of an amplifier provided at an output stage of an intermediate frequency amplifying circuit 20 of a mobile communication system according to the general embodiment of the present invention, and the same parts as used in FIG. 3 are assigned the same reference numerals. In FIG. 7, reference numeral 18 denotes a power source (Vcc), C1, C3, and C4 denote capacitors, OP denotes an operational amplifier, Q1 denotes an NPN type transistor, R1 to R3 and R6 to R8 denote resistors, an VR denotes a variable resistor.

The last stage of the intermediate amplifying circuit 20 is composed of three transistors R1–R3, a semiconductor switch 21, and the transistor Q1. The collector of the transistor Q1 is directly connected to the power source (Vcc), the base is connected to the connecting point of the resistors R1 and R2, and the emitter is grounded via the semiconductor switch 21 and the resistor R3 connected in series. The resistor R3 has a high impedance the same as the conventional intermediate frequency amplifying circuit. The emitter of the transistor Q1 is also connected to the active filter 16 via the capacitor C1. Unlike the conventional intermediate frequency amplifying circuit 20, a speed-up circuit 30 is not provided between the circuit 20 and the active filter 16. The free end of the resistor R2 is grounded and the free end of the resistor R1 is connected to Vcc. The semiconductor switch 21 is intermittently turned ON by the power save control signal applied at the input terminal 22 from the controller (not shown) for a predetermined time period in the stand-by period and is continuously ON during the communication period.

According to the embodiment in FIG. 7, the semiconductor switch 21 is OFF in the stand-by period (this is called the power save period). However, even if the semiconductor switch 21 is OFF, a leakage current of several $\mu$ A flows through therein because of the characteristics of the element. When the leakage current flows through the semiconductor switch 21, a leakage current also flows through the transistor Q1 and the capacitor C1 is charged thereby. Accordingly, some voltage is generated at an output terminal 40 of the intermediate frequency amplifying circuit 20 even when the semiconductor switch 21 is OFF. In this way, unlike the conventional OFF state of the semiconductor switch 17 as shown in FIG. 3, some voltage is generated during the power save period in the present embodiment, so that the difference of the voltage at the output terminal 40 of the intermediate frequency amplifying circuit 20 between the power save period and when the power save period is cancelled becomes small.

As a result, when the semiconductor switch 21 is turned ON, the time to obtain the reference voltage for sampling, namely the rise time of the output voltage at the output terminal 40 of the intermediate frequency amplifying circuit 20, can be shortened.

Figure 8:
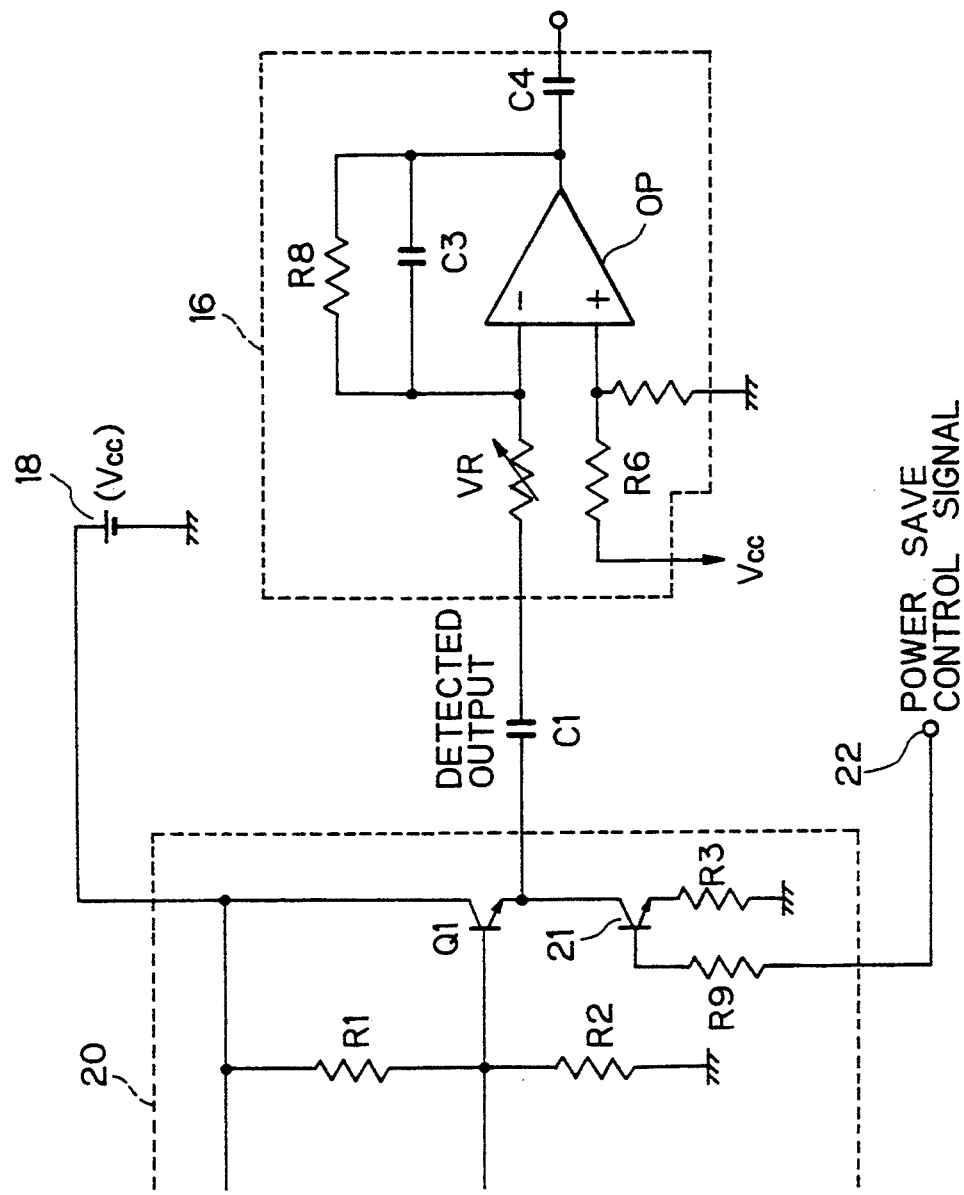
FIG. 8 is a circuit diagram showing the construction of an amplifier provided at an output stage of an intermediate frequency amplifying circuit of a mobile communication system according to the embodiment of the present invention.

FIG. 8 is a circuit diagram showing the construction of an amplifier provided at the output stage of an intermediate frequency amplifying circuit 20 of a mobile communication system according to the one concrete embodiment of the present invention. Accordingly, in FIG. 8, the same parts as used in FIG. 7 are assigned the same reference numerals and the explanation thereof is omitted. In this embodiment, the semiconductor switch 21 is composed of an NPN type transistor whose collector is connected to the emitter of the transistor Q1, emitter is connected to the resistor R3, and base is connected to the input terminal 22 of the power save control signal via a resistor R9.

Also in this embodiment, even if the transistor 21 is OFF, a leakage current of several $\mu$ A flows from the collector to the emitter because of the characteristics of the transistor. When the leakage current flows through the transistor 21, a leakage current also flows through the transistor Q1 and the capacitor C1 is charged thereby. Accordingly, some voltage is generated at an output terminal 40 of the intermediate frequency amplifying circuit 20 even when the transistor 21 is OFF. As a result, when the transistor 21 is turned ON, the time to obtain the reference voltage for sampling, namely the rise time of the output voltage at the output terminal 40 of the intermediate frequency amplifying circuit 20, can be shortened.

In this way according to the present invention, it is possible to speed-up the rise time of the input signal to the active filter along with simplification of the circuit and at a lower cost.

What is claimed is:

1. In a mobile communication system wherein only the circuits necessary for detecting a call send or a call receive operation are activated intermittently to reduce power consumption from the battery during a stand-by period, and all of the circuits are continuously activated by being supplied with power during a call operation, an amplifier provided at an output stage of an intermediate frequency amplifying circuit of said mobile communication system comprising:

an output transistor an output terminal thereof being connected to a load circuit via a capacitive connecting circuit;

a circuit for supplying an operating direct current, other than through the capacitive connecting circuit, to said output transistor; and a semiconductor switch provided in said current supply circuit and operatively connected to the output terminal of said output transistor, and to an input of said capacitive connecting circuit said semiconductor switch further including, an input for receiving a control signal to switch control of said semiconductor switch periodically in a predetermined time when said system is in a stand-by period but continuously when said system is in a calling period.

2. An amplifier as set forth in claim 1, wherein said semiconductor switch is an NPN transistor.

3. The amplifier of claim 1 wherein said semiconductor switch is operatively connected to said output terminal of said output transistor so as to provide a leakage current path to charge said capacitive connecting circuit when said system is periodically ON during said stand-by period.

4. In a mobile communication system wherein only the circuits necessary for detecting a call send or a call receive operation are activated intermittently to reduce power consumption from the battery during a stand-by period, and all of the circuits are continuously activated by being supplied with power during a call operation, an amplifier provided at an output stage of an intermediate frequency amplifying circuit of said mobile communication system comprising:

an output transistor having an output terminal thereof being connected to a load circuit via a capacitive connecting circuit, the capacitive coupling circuit having an input for receiving a signal from said output terminal and an output for transferring a signal to the load circuit; and a semiconductor switch having a terminal that is operatively coupled to said output terminal of said output transistor and the input of said capacitive connecting circuit, the semiconductor switch further including, an input terminal for receiving a control signal to switch control of said semiconductor switch periodically in a predetermined time when said system is in a stand-by period but continuously when said system is in a calling period to provide a minimum voltage to said capacitive connecting circuit during said stand-by period.

5. An amplifier as set forth in claim 4, wherein said semiconductor switch is an NPN transistor.

* * * * *

UNITED STATES PATENT AND TRADEMARK OFFICE
CERTIFICATE OF CORRECTION

PATENT NO. : 5,339,460
DATED : August 16, 1994
INVENTOR(S) : Sakata et al.

It is certified that error appears in the above-indentified patent and that said Letters Patent is hereby corrected as shown below:

Column 6, line 49, after "transistor" insert --having--.

Signed and Sealed this

Tenth Day of November 1998

Attest:

BRUCE LEHMAN

Attesting Officer

Commissioner of Patents and Trademarks